United States Patent
Creamer et al.

(10) Patent No.: US 7,487,090 B2
(45) Date of Patent: *Feb. 3, 2009

(54) SERVICE FOR PROVIDING SPEAKER VOICE METRICS

(75) Inventors: Thomas E. Creamer, Boca Raton, FL (US); Peeyush Jaiswal, Boca Raton, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 889 days.

This patent is subject to a terminal disclaimer.

(21) Appl. No.: 10/736,253

(22) Filed: Dec. 15, 2003

(65) Prior Publication Data

US 2005/0129189 A1   Jun. 16, 2005

(51) Int. Cl.
*G10L 17/00* (2006.01)
(52) U.S. Cl. .................... 704/248; 379/88.02
(58) Field of Classification Search ............... 704/246; 379/88.02
See application file for complete search history.

(56) References Cited

U.S. PATENT DOCUMENTS

| | | | |
|---|---|---|---|
| 5,987,415 A * | 11/1999 | Breese et al. ............... 704/270 |
| 6,009,392 A | 12/1999 | Kanevsky et al. | |
| 6,064,753 A | 5/2000 | Bolle et al. | |
| 6,104,922 A * | 8/2000 | Baumann ................ 455/410 |
| 6,213,391 B1 | 4/2001 | Lewis | |
| 6,256,737 B1 | 7/2001 | Bianco et al. | |
| 6,397,198 B1 | 5/2002 | Hoffman et al. | |
| 6,493,669 B1 | 12/2002 | Curry et al. | |
| 6,545,682 B1 | 4/2003 | Ventrella et al. | |
| 6,591,242 B1 | 7/2003 | Karp et al. | |
| 6,721,706 B1 * | 4/2004 | Strubbe et al. ............. 704/275 |
| 6,728,679 B1 * | 4/2004 | Strubbe et al. ........... 704/270.1 |
| 6,904,264 B1 * | 6/2005 | Frantz ...................... 455/3.04 |
| 7,222,075 B2 * | 5/2007 | Petrushin .................. 704/270 |
| 2004/0006476 A1 * | 1/2004 | Chiu ...................... 704/270.1 |
| 2004/0083101 A1 * | 4/2004 | Brown et al. .............. 704/235 |
| 2005/0010411 A1 * | 1/2005 | Rigazio et al. ............. 704/246 |

OTHER PUBLICATIONS

Scherer, K. R., R. Banse, H.G. Wallbott, and T. Goldbeck, "Vocal Cues in Emotion Encoding and Decoding," Motivation and Emotion, 1991, vol. 15, No. 2, pp. 123-148.*

* cited by examiner

*Primary Examiner*—Susan McFadden
(74) *Attorney, Agent, or Firm*—Akerman Senterfitt

(57) ABSTRACT

A method of providing voice metrics over an established telephone call between a user and a subscriber can include receiving voice information from the user over the call and determining biometric information from the voice information for the user. The method further can include encoding the biometric metric information and sending the biometric information to the subscriber over the call.

6 Claims, 1 Drawing Sheet

SERVICE FOR PROVIDING SPEAKER VOICE METRICS

BACKGROUND

1. Field of the Invention

The invention relates to communications systems and, more particularly, to conveying biometric information over a communications system.

2. Description of the Related Art

When one caller places a telephone call to another caller, it may be difficult for one caller to determine how the other caller, or speaker, is feeling from an emotional perspective. Without the aid of visual images, often times, a listener is left to rely upon past experience in dealing with the speaker to perceive attributes of the speaker's voice that indicate emotional states. For example, from past interactions, the listener may be able to determine that the speaker is stressed, happy, or sad. That is, the listener must rely upon hearing and judgment to gauge the speaker's state of being.

The ability to determine such attributes can be beneficial, particularly in cases where one has had no previous interaction, or minimal interaction, with a call participant. In such cases, recognizing the call participant's emotional state would be difficult, if not impossible. For example, in cases where one is engaging in a conference call with unknown individuals, the ability to determine another's emotional state, or biometric information that provides an indication of one's state of being, can be beneficial.

The ability to determine one's state of being can be beneficial in other situations such as checking on a child. Children tend to be less talkative when in the company of adults. For example, when checking on a child that is in the presence of others, such as a babysitter, the child is likely to respond to inquiries about the child's well being with uninformative answers such as "I'm fine" or "I'm okay". The ability to determine the child's state of being would provide parents with valuable information as to the child's welfare.

SUMMARY OF THE INVENTION

The present invention provides a method, system, and apparatus for determining biometric information from a speaker's voice. More particularly, in accordance with the inventive arrangements disclosed herein, biometric information such as a speaker's voice level, stress level, voice inflection, and emotion can be determined from voice signals received over a telephone call. The biometric information can be encoded and provided to a subscriber engaged in the call with the speaker.

One aspect of the present invention can include a method of providing biometric information over an established telephone call between a speaker and a subscriber. The method can include receiving voice information from the speaker over the call, determining biometric information from the voice information of the speaker, encoding the biometric information, and sending the biometric information to the subscriber over the call. That is, the biometric information can be sent as an encoded stream of information embedded within the voice stream of the call.

The determining step can include extracting at least one attribute from the voice information, comparing the at least one attribute with voice metrics, and generating the biometric information based upon the comparing step. The encoding step can include removing inaudible portions of the voice information and embedding the biometric information in place of the inaudible portions within a voice stream carried over the call.

The biometric information can specify an indication of a speaker's voice level, stress level, voice inflection, and/or an emotional state. Notably, the subscriber can receive the biometric information and voice signals, both of the speaker, substantially concurrently over the call. The method further can include decoding the received biometric information and presenting the information to the subscriber.

Other embodiments of the present invention can include a system having means for performing the various steps disclosed herein and a machine readable storage for causing a machine to perform the steps described herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
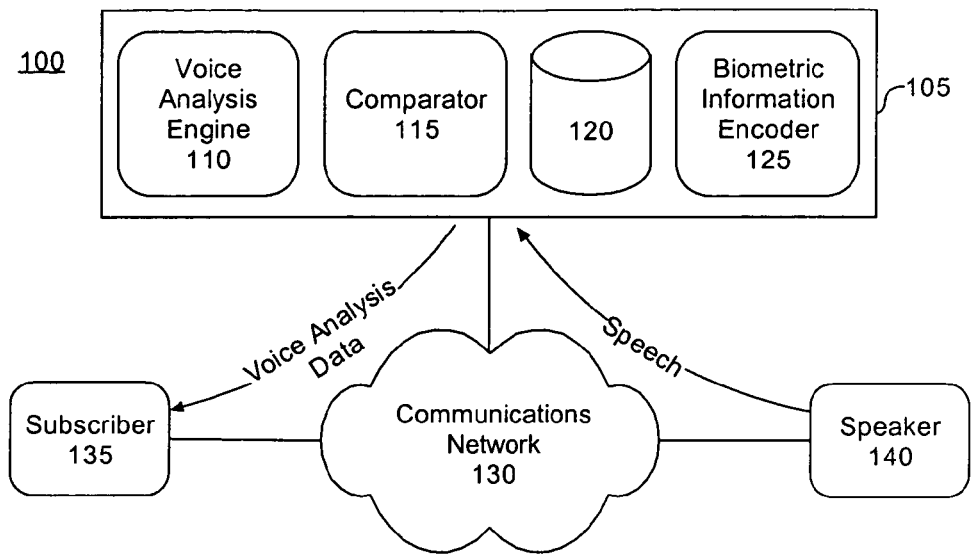
FIG. 1 is a schematic diagram illustrating a system for determining biometric information from a speaker's voice in accordance with one embodiment of the present invention.

FIG. 1 is a schematic diagram illustrating a system 100 for determining biometric information from a speaker's voice in accordance with one embodiment of the present invention. As shown, the system 100 can include a voice analysis system 105 which can be communicatively linked with a communications network 130 such as the Public Switched Telephone Network (PSTN).

The voice analysis system 105 can be implemented in an information processing system, such as a computer system or server having a telephony interface, for example one communicatively linked with a telephone switching system, or a processing card disposed within a telephone switching system. As such, the voice analysis system 105 can be patched into a telephone call between two or more callers. For example, a subscriber to a service involving the voice analysis system 105 can invoke the service using one or more touch tone keys prior to a call or during an ongoing call.

The voice analysis system 105 can include a biometric analysis engine 110, a comparator 115, a data store 120 including voice metrics, and a biometric information encoder 125. The biometric analysis engine 110 can extract biometric information from speech or voice signals received over a telephone call. For example, the biometric analysis engine 110 can determine one or more attributes that are indicative of a speaker's voice level, stress level, voice inflection, and/or emotional state.

The comparator 110 can compare the attributes determined by the biometric analysis engine 110 with one or more voice metrics stored in the data store 120. The voice metrics can be a collection of empirically determined attributes representing various voice levels, stress levels, voice inflections, and/or emotional states. Based upon the comparison of speaker voice attributes with voice metrics, the comparator 110 can generate biometric information which can specify an indication of a speaker's voice level, stress level, voice inflection, and/or emotional state.

The biometric information encoder 125 can encode any generated biometric information for transmission to the subscriber. Once the biometric information is generated, the information can be encoded and provided as embedded digital information within a digital voice stream of a telephone call. As such, one aspect of the biometric information encoder 125 can be implemented as a perceptual audio processor, similar to a perceptual codec, to analyze a received voice signal. A perceptual codec is a mathematical description of the limitations of the human auditory system and, therefore, human auditory perception. Examples of perceptual codecs can include, but are not limited to MPEG Layer-3 codecs and MPEG Layer-4 codecs. The biometric information encoder 125 is substantially similar to the perceptual codec with the noted exception that the biometric information encoder 125 can, but need not implement, a second stage of compression as is typical with perceptual codecs.

The biometric information encoder 125, similar to a perceptual codec, can include a psychoacoustic model to which source material, in this case a voice signal from a call participant, can be compared. By comparing the voice signal with the stored psychoacoustic model, the perceptual codec identifies portions of the voice signal that are not likely, or are less likely to be perceived by a listener. These portions are referred to as being inaudible. Typically a perceptual codec removes such portions of the source material prior to encoding, as can the biometric information encoder 125.

Still, those skilled in the art will recognize that the present invention can utilize any suitable means or techniques for encoding biometric information and embedding such digital information within a digital voice stream. As such, the present invention is not limited to the use of one particular encoding scheme.

In operation, a telephone call can be established between a subscriber 135 and a speaker 140 over the communications network 130. The speech or voice signals of the speaker 140 can be provided to the voice analysis system 105. The voice analysis system 105 can determine biometric information from the speaker's 140 voice. The biometric information can be provided to the subscriber 135 as embedded digital information within a digital voice stream of the telephone call.

It should be appreciated that the subscriber 135 can be equipped with a suitable telephony device that is capable of decoding the received biometric information and presenting the information to the subscriber 135. For example, in one embodiment, the information can be displayed upon a display incorporated within or attached to the subscriber's 135 telephony device. In another embodiment, the biometric information can be presented audibly. That is, the information can be decoded and provided to a text to speech system to be played to the subscriber through the subscriber's telephony device or another device communicatively linked to the telephony device.

Figure 2:
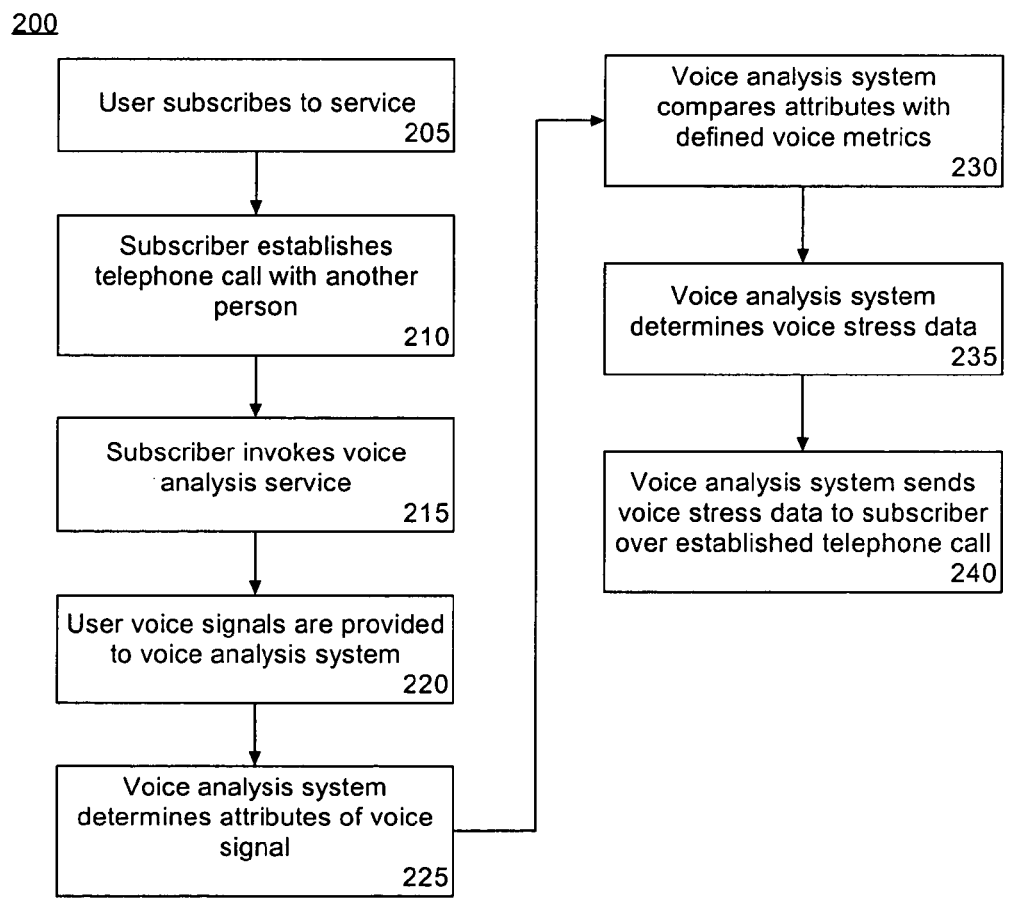
FIG. 2 is a flow chart illustrating a method of determining biometric information from a speaker's voice in accordance with another embodiment of the present invention.

FIG. 2 is a flow chart illustrating a method 200 of determining biometric information from a speaker's voice in accordance with another embodiment of the present invention. The method can begin in step 205 where a user subscribes to a voice analysis service. In step 210, the subscriber can establish a telephone call with another person, a speaker.

In step 215, the subscriber can invoke the voice analysis service. As noted, the subscriber can invoke the service by keying a particular code or sequence of digits or by issuing a spoken request. In step 220, voice signals from the speaker, that is the other call participant, can be provided to the voice analysis system. For example, the voice analysis system can be patched into the telephone call such that the voice signals from the speaker are provided to the voice analysis system for processing. In step 225, the voice analysis system determines one or more attributes of the voice signal.

In step 230, the voice analysis system compares the attributes with defined voice metrics. In step 235, the voice analysis system determines biometric information relating to the speaker's voice. As noted, the biometric information can include, but is not limited to, a speaker's voice level, stress level, voice inflection, and/or emotional state. The biometric information, for example a rating of voice level, stress level, voice inflection, and/or indication of an emotional state including a measure of degree of the emotional state, can be determined through the comparison of the speaker's voice attributes with the established voice metrics.

In step 240, the voice analysis system sends the biometric information to the subscriber over the established telephone call. More particularly, the biometric information can be sent to the subscriber as an encoded stream of digital information that is embedded within the digital voice stream. The biometric information encoder can identify which portions of the received audio signal are inaudible, for example using a psychoacoustic model.

For instance, humans tend to have sensitive hearing between approximately 2 kHz and 4 kHz. The human voice occupies the frequency range of approximately 500 Hz to 2 kHz. As such, the biometric information encoder can remove portions of a voice signal, for example those portions below approximately 500 Hz and above approximately 2 kHz, without rendering the resulting voice signal unintelligible. This leaves sufficient bandwidth within a telephony signal within which the biometric information can be encoded and sent within the digital voice stream.

The biometric information encoder further can detect sounds that are effectively masked or made inaudible by other sounds. For example, the biometric information encoder can identify cases of auditory masking where portions of the voice signal are masked by other portions of the voice signal as a result of perceived loudness, and/or temporal masking where portions of the voice signal are masked due to the timing of sounds within the voice signal.

It should be appreciated that as determinations regarding which portions of a voice signal are inaudible are based upon a psychoacoustic model, some users will be able to detect a difference should those portions be removed from the voice signal. In any case, inaudible portions of a signal can include those portions of a voice signal as determined from the biometric information encoder that, if removed, will not render the voice signal unintelligible or prevent a listener from understanding the content of the voice signal. Accordingly, the various frequency ranges disclosed herein are offered as examples only and are not intended as a limitation of the present invention.

The biometric information encoder can remove the identified portions, i.e. those identified as inaudible, from the voice signal and add the biometric information in place of the removed portions of the voice signal. That is, the biometric information encoder replaces the inaudible portions of the voice signal with digital biometric information. As noted, the biometric information can include, but is not limited to, voice levels, stress levels, voice inflections, and/or emotional states as may be determined from a speaker's voice.

As noted, the biometric information can be decoded in the subscriber's telephone device, or a device attached to the subscriber's telephony equipment. The biometric information then can be present to the subscriber in a visual format or played through an audio interface. Notably, the biometric information can be received with the speaker's voice stream such that the subscriber is able to be presented with the biometric information of the speaker while engaged in the telephone call and hearing the speaker's voice.

The method 200 has been provided for purposes of illustration only. As such, it should be appreciated that one or more of the steps disclosed herein can be performed in differing order depending upon the particular configuration of the present invention. For example, the subscriber can invoke the voice analysis service at any time prior to a call or during a call. Additionally, the present invention can be used regardless of whether the subscriber initiates a call or receives a call.

Further, in one embodiment, the subscriber can specify which voice stream is to be analyzed, for example by keying in a telephone number of the party or voice source. Such an embodiment can be useful in the context of conference calls. In any case, the examples disclosed herein are not intended as a limitation of the present invention.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of providing biometric information over a telephone call established between a speaker and a subscriber comprising:
   subscribing a voice analysis service by the subscriber;
   receiving a voice stream from the speaker, said voice stream including a plurality of voice signals of the speaker;
   invoking the voice analysis service by the subscriber;
   providing the voice signals to the voice analysis service;
   determining biometric information from the voice signals of the speaker by the voice analysis service;
   identifying inaudible portions in the voice stream using a psychoacoustic model;
   modifying said voice stream by encoding the determined biometric information and replacing the identified inaudible portions of the voice stream with said encoded information; and
   transmitting the modified voice stream to the subscriber over the established telephone call.

2. The method of claim 1, said determining step comprising:
   extracting at least one attribute from the voice signals;
   comparing the at least one attribute with voice metrics; and
   generating the biometric information based upon said comparing step.

3. The method of claim 1, wherein at least one other speaker is connected to the call, and wherein the method further comprises:
   prior to said receiving step, selecting one among the voice signals of the speaker and the voice signals of the other speaker to be analyzed; and
   performing the steps of receiving, determining, generating, identifying, encoding, and transmitting only for said selected speaker.

4. The method of claim 1, wherein the biometric information specifies at least one of an indication of voice level, stress level, voice inflection, and an emotional state.

5. The method of claim 1, wherein the subscriber receives the voice signals and the associated biometric information, both of the speaker, substantially concurrently over the call.

6. The method of claim 1, further comprising:
   extracting the embedded biometric information from the transmitted voice stream;
   decoding the extracted biometric information; and
   presenting the information to the subscriber.

* * * * *